C. F. HILL.
STEERING MECHANISM FOR MOTOR PLOWS.
APPLICATION FILED JUNE 14, 1909.
933,984.
Patented Sept. 14, 1909.
2 SHEETS—SHEET 1.
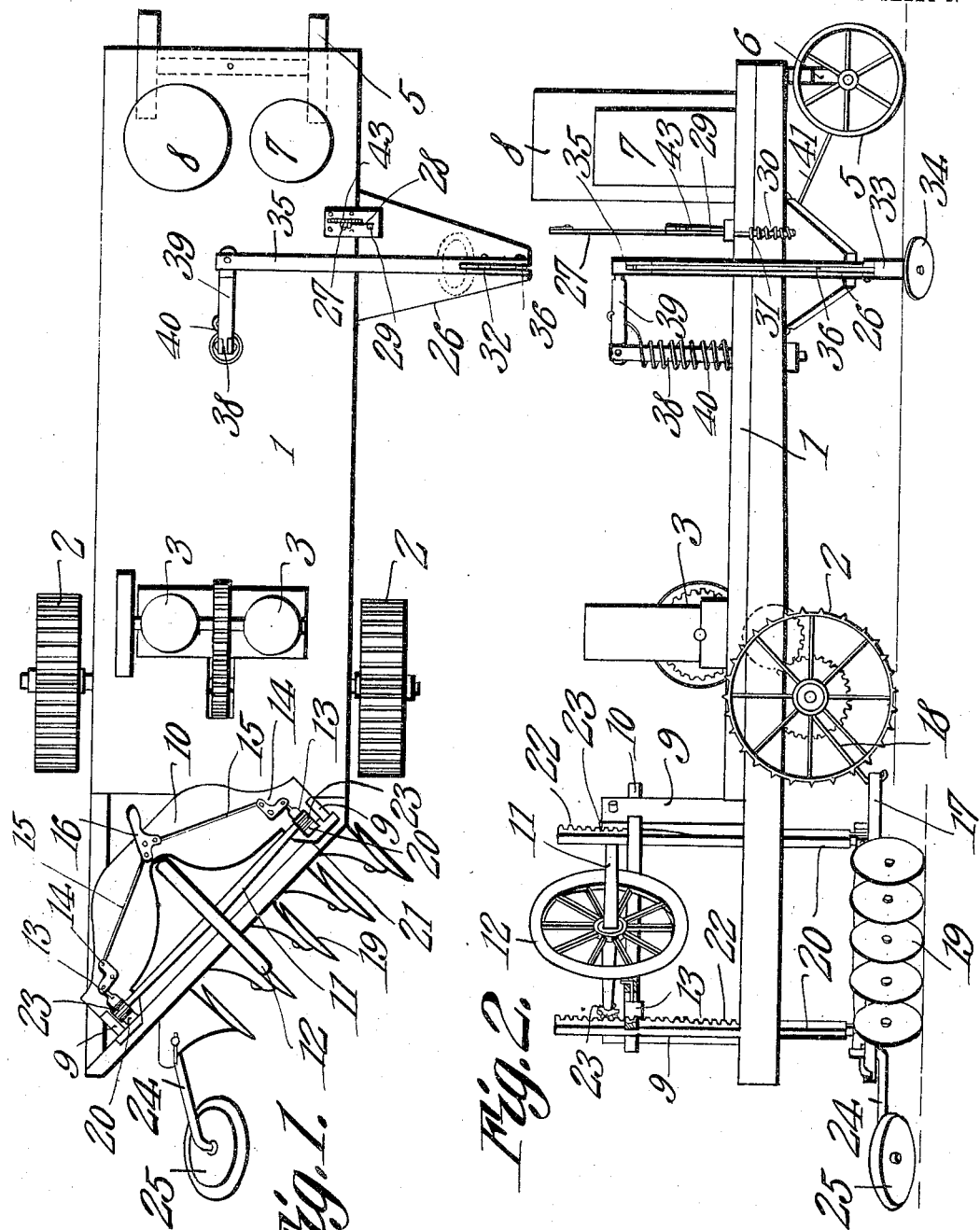
Witnesses
E. F. Stuart
C. E. Preinkert
Inventor
Charles F. Hill.
By C. A. Snow & Co.
Attorneys

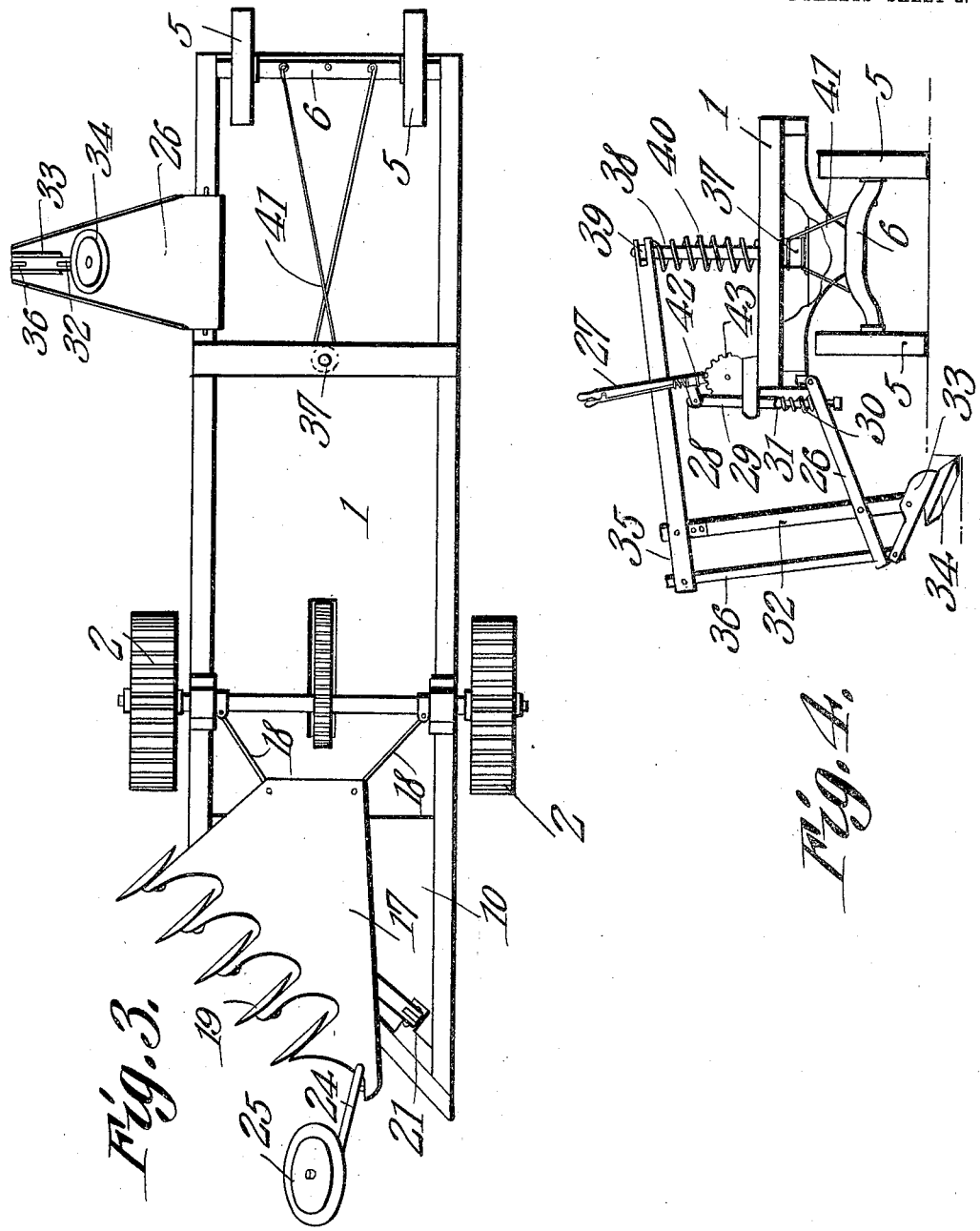

UNITED STATES PATENT OFFICE.

CHARLES F. HILL, OF BLANKET, TEXAS.

STEERING MECHANISM FOR MOTOR-PLOWS.

933,984.

Specification of Letters Patent. Patented Sept. 14, 1909.

Application filed June 14, 1909. Serial No. 502,103.

*To all whom it may concern:*

Be it known that I, CHARLES F. HILL, a citizen of the United States, residing at Blanket, in the county of Brown and State of Texas, have invented a new and useful Steering Mechanism for Motor-Plows, of which the following is a specification.

This invention has relation to steering mechanism for motor plows, and it consists in the novel construction and arrangement of its parts, as hereinafter shown and described.

The object of the invention is to provide a mechanism adapted to be applied to the frame of a motor plow for the purpose of steering the same with relation to the land side of a furrow which has previously been cut in the soil.

With the above object in view the steering mechanism comprises a windlass journaled upon the body of the plow, and which is operatively connected with the steering axle of the same in the usual manner. The shaft of the windlass is projected above the platform of the plow and is provided with a laterally disposed arm, a bar is pivotally connected at one end with the said arm, and at its other end is pivotally connected with the upper end of a link. The lower end of the said link is pivotally connected with the lower end of an arm, upon which is journaled a furrow wheel. A laterally disposed bracket is hingedly connected at one side of the platform of the plow, and a lever is fulcrumed to the outer portion of the said bracket. The working end of the said lever is pivotally connected with the last said arm, upon which the furrow wheel is journaled, and the power end of the said lever is adjustably and pivotally connected with the first said bar. Means is provided for raising and lowering the said bracket, and for holding the same resiliently in a lowered position, and a spring mechanism is provided in connection with the windlass or its shaft to maintain the parts operated or operatively connected therewith in normal position. A furrow-wheel is attached to or connected with the rear portion of the frame of the plow and is adapted to coöperate with the steering mechanism hereinafter to be described, for the purpose of holding the rear portion of the plow in proper alinement, irrespective of the plow shares or disks carried by the frame of the plow.

In the accompanying drawings:—Figure 1 is a top plan view of the motor plow equipped with the steering mechanism. Fig. 2 is a side elevation of the same. Fig. 3 is a bottom plan view of the same. Fig. 4 is a front end elevation of the same, with parts removed.

The plow to which the steering mechanism is applied is of the usual arrangement of motor plows and consists of a platform 1, mounted at its rear portion upon traction wheels 2. The wheels 2 are operatively connected in any suitable manner with an engine 3, which is mounted upon the platform 1.

The forward portion of the platform 1 is mounted upon a dirigible axle 6, which, in turn, is supported by ground wheels 5. Tanks 7 and 8 are mounted upon the forward portion of the platform 1 and are adapted to contain oil and water respectively, to be utilized by the engine 3. Uprights 9 are mounted upon the rear portion of the platform 1 and are connected together at their upper portions by means of a cross-piece 10. A shaft 11 is journaled for rotation in the upper portions of the uprights 9, and the said shaft 11 is provided at a point intermediate of its ends with an operating wheel 12. Blocks 13 are slidably mounted in recesses provided in the cross-piece 10, and bell-crank rockers 14 are fulcrumed upon the said cross-piece, and, at their outer ends, pivotally connect with pins carried by the block 13. Rods 15 are pivotally connected at their outer ends with the inner ends of the rockers 14, and at their inner ends are pivotally connected with the working end of a lever 16, which, in turn is fulcrumed upon the said cross-piece 10.

A disk frame 17 is pivotally connected by means of links 18 with the hind axle of the plow, and a gang of disks 19 is journaled for rotation upon the said disk frame 17. Uprights 20 are mounted upon the disk frame 17 and extend vertically through guides 21, mounted upon the rear portion of the platform 1, and, at their upper forward sides the said uprights 20 are provided with gear teeth 22. The shaft 11 is provided in the vicinity of its ends with gear wheels 23 which mesh with the gear teeth 22 of the uprights 20. An arm 24 is pivotally attached to the rear portion of the frame 17, and a furrow wheel 25 is journaled to the rear end of the said arm 24. The furrow wheel 25 is pitched at an angle to the surface of the ground and is adapted to engage the side wall of the furrow opened by the inner disk or share 19.

A bracket 26 is hingedly attached to the furrow side of the forward portion of the platform 1. A lever 27 is fulcrumed upon the platform 1 and is provided with a laterally disposed arm 28, which is connected with the bracket 26 by means of a bar 29. The lower portion of the bar 29 slidably engages the bracket 26 and a coiled spring 30 is interposed between a stop or shoulder 31 carried by the bar 29 and the upper surface of the said bracket 26. The said spring 30 is under tension with a tendency to hold the bracket 26 in a lowered position. A lever 32 is fulcrumed in the outer portion of the bracket 26, and an arm 33 is pivotally attached to the lower end of the said lever 32. A furrow wheel 34 is journaled to the lower portion of the arm 33 and is normally inclined at an angle to the surface of the ground and is adapted to bear against the side of the furrow. The upper end of the lever 32 is adjustably and pivotally connected with a bar 35, and the upper end of a link 36 is pivoted to the outer end of the bar 35, and the lower end of the said link 36 is pivoted to the outer end of the arm 33 in the manner as illustrated in Fig. 4 of the drawings. A windlass 37 is journaled for rotation under the forward portion of the platform 1 and is provided with a shaft 38, which projects above the upper surface of the said platform 1. At its upper end the shaft 38 is provided with a forwardly disposed arm 39, and the inner end of the bar 35 is pivotally connected with the forward end of the said arm 39. A coil spring 40 surrounds the shaft 37 and at its lower end is fixed with relation to the platform 1, and at its upper end bears against the side of the arm 39, and the said spring 40 is under tension with a tendency to swing the forward end of the arm 39 toward the bracket 26. Steering cables 41 are fixed at their forward ends to the axle 6, at the opposite sides of its pivotal connection with the platform 1, and at their rear ends the said cables pass around the windlass 37. If desired, the cables 41 may be continuous and, when such is the case, the cables wrap around the windlass 37 at its intermediate portion and in opposite directions, as illustrated in Fig. 3 of the drawings.

From the above description, it is obvious that, by rotating the shaft 11 through the instrumentality of the wheel 12, the uprights 20 may be raised or lowered, and the plow-frame 17 may be raised or lowered, and, when in an adjusted position, the lever 16 may be swung so that the blocks 13 will be brought into engagement with the teeth 22 of the uprights 20, whereby the frame 17 will be held in an adjusted position. It will also be seen that by swinging the lever 27 the bracket 26 may be swung in a vertical direction, and, when in an adjusted position may be held at such position by permitting a pawl 42 to engage the teeth of a gear segment 43, which is mounted upon the platform 1.

As above stated, when the bracket 26 is lowered, it is held in a downwardly disposed position under the tension of the spring 30. As the plow moves along the side of a furrow and the wheel 34 is in engagement with the land side thereof, the said wheel will follow the vertical wall of the furrow, and as the furrow turns or bends the wheel 34 will follow the same, and the lever 32 will be swung upon its fulcrum connection with the bracket 26. Thus the upper end of the lever 32 will be swung in or out, and the bar 35 will be moved longitudinally. As the said bar 35 moves longitudinally the arm 29 is swung and the shaft 13 is turned upon its axis, as is also the windlass 37 attached to the lower end of the said shaft. As the windlass 37 turns the cable or cables 41 are wound and unwound from the same, so that the dirigible axle 6 is turned upon its pivotal connection with the platform 1, and thus the supporting wheels 5 are steered, and the plow is caused to follow in a line approximately parallel with the vertical wall of the furrow with which the wheel 34 is in engagement. By adjusting the pivotal connection between the upper end of the lever 32 and the outer portion of the bar 35 the wheel 34 may be presented to the vertical side of the furrow at any desired angle. By this arrangement it will be seen that means is provided for automatically steering the plow, to cause the same to follow, approximately parallel with the vertical wall of the furrow previously opened, and, consequently, if the said furrow surrounds with comparatively long curves or turns, a patch of ground to be tilled the plow will follow the said furrow and the succeeding furrows opened by itself until the said patch is completely turned under.

Having described my invention, what I claim as new and desire to secure, by Letters Patent, is:—

1. A plow comprising a platform supported at its forward end upon a dirigible axle, a windlass mounted upon the platform, cables operatively connecting the windlass with the axle, a bracket hingedly attached to the platform, a lever fulcrumed to the bracket, a furrow wheel carried by the lever, and means operatively connecting the said lever with the said windlass.

2. A plow comprising a platform supported at one end upon a dirigible axle, a windlass mounted upon the platform, cables operatively connecting the windlass with the axle, a bracket hingedly attached to the platform, means for raising and lowering the bracket, a lever fulcrumed to the bracket, a furrow wheel carried by the lever, and means operatively connecting the said lever with the said windlass.

3. A plow comprising a platform supported at one end upon a dirigible axle, a windlass mounted upon the platform, cables operatively connecting the windlass with the axle, a lever operatively connected with the windlass, and a furrow wheel carried by the lever.

4. A plow comprising a platform supported at one end upon a dirigible axle, a windlass mounted upon the platform, cables operatively connecting the windlass with the axle, a bracket hingedly attached to the platform, a lever fulcrumed to the bracket, an arm pivoted to the lower end of the lever, a furrow wheel journaled upon the arm, a bar operatively connected with the windlass and pivoted to the lever, and a link connecting the said bar with the said arm.

5. A plow comprising a platform supported at one end upon a dirigible axle, a windlass mounted upon the platform, cables operatively connecting the windlass with the axle, a bracket hingedly attached to the platform, a lever fulcrumed to the bracket, an arm pivoted to the lever, a furrow wheel journaled upon the arm, a bar operatively connected with the windlass and with which the lever is adjustably and pivotally connected, and a link pivotally connecting the said bar with the said arm.

6. A plow comprising a platform supported at one end upon a dirigible axle, a windlass mounted upon the platform, cables operatively connecting the windlass with the axle, a bracket hingedly attached to the platform, a lever fulcrumed to the bracket, an arm pivoted to the lever, a furrow wheel journaled upon the arm, a bar pivotally connected with the lever and operatively connected with the windlass, a link pivotally connecting the said bar and the arm, and a spring means operating upon the windlass, with a tendency to hold the same in a normal position.

In testimony that I claim the foregoing as my own, I have hereto affixed my signature in the presence of two witnesses.

CHARLES F. HILL.

Witnesses:
H. C. MAYNOR,
J. E. BURNETT.